Jan. 18, 1938.     W. L. JACKSON ET AL     2,106,118
HOSE JOINT TIGHTENER
Filed April 11, 1936
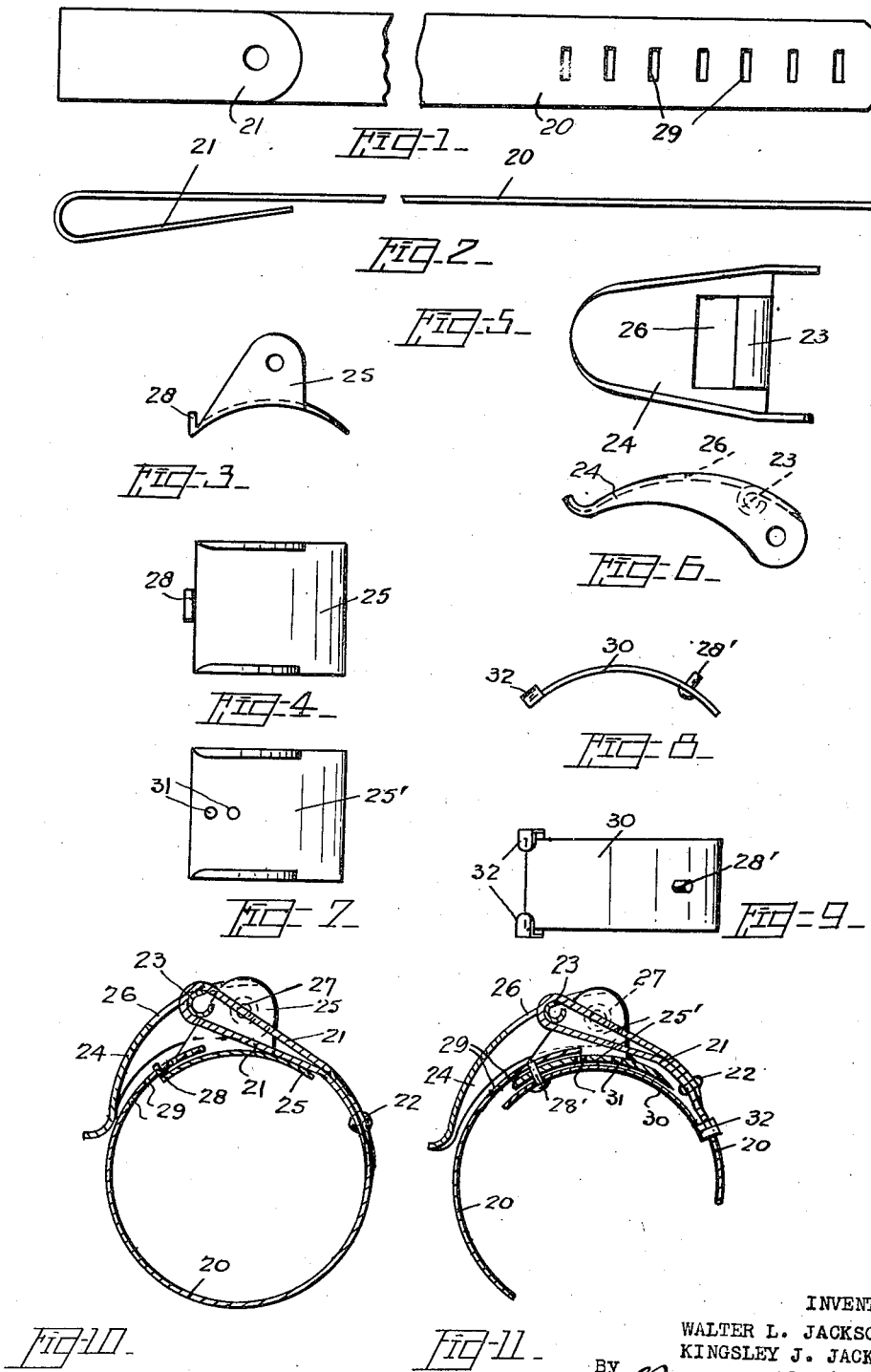
INVENTORS
WALTER L. JACKSON
KINGSLEY J. JACKSON
BY Norris & Bateman
ATTORNEYS Patented Jan. 18, 1938

2,106,118

UNITED STATES PATENT OFFICE 2,106,118

HOSE JOINT TIGHTENER

Walter Leslie Jackson and Kingsley John Jackson, Perth, Western Australia, Australia Application April 11, 1936, Serial No. 73,952
In Australia June 21, 1935

3 Claims. (Cl. 24—19)

This invention relates to a hose joint or similar tightener, and provides certain improvements in the construction and operation of same.

The said invention, by such construction, may be easily operated in a minimum of time, and comprises a minimum number of parts and members. Further, the said invention may be adjustably tightened to suit and adapt itself to varying sizes of tubes, hoses and/or the like.

In order however that the invention may be clearly understood, the same will be described with the aid of the accompanying drawing in which:—

Figs. 1 and 2 are respectively a plan and edge elevation (shown broken) of the peripheral band in flat condition;

Figs. 3 and 4 are respectively a side elevation and plan of the bracket;

Figs. 5 and 6 are respectively a plan and side elevation of the operative cam lever;

Fig. 7 is a plan (similar to Fig. 4), showing a slight modification thereof;

Figs. 8 and 9 are respectively an edge elevation and plan of the auxiliary slidably mounted adapter plate or member;

Fig. 10 is a sectional elevation showing the clip illustrated in Figs. 1 to 6 (inclusive) as assembled in the tightened position;

Fig. 11 is a fragmentary sectional elevation showing the clip as illustrated in Figs. 1, 2, 3 (in part), and 5 to 9 inclusive, as assembled.

Referring to the said drawing:—

The invention comprises a flexible metal band 20 formed at one end with a loop 21 whereby same is freely held by a rivet 22 over and on the folded lip 23 of the cam-lever 24, the said lip being eccentrically positioned in the said lever, in respect of the pivot pins of the latter.

The said lip 23 forms the gapped or slotted opening 26. The said cam-lever 24 is by pivot pins 27 carried between the cheeks of the bracket 25. On the base plate of the latter is integrally made or formed the upstanding pin 28 over which is anchored the free end of the band 20, by the therein co-acting slots or holes 29.

In lieu of the upstanding pin 28 being made integral with the said bracket as shown, same may be secured within said base plate of the bracket.

Alternatively, the equivalent of said pin 28 that is a pin 28' may be fitted or fixed within an auxiliary adapter plate 30 which is to be slidably carried and mounted on the band 20.

In conjunction or in combination with the said auxiliary adapter plate there are made companion holes 31 in the aforesaid base plate of the bracket used in conjunction therewith as shown in Fig. 1 and identified as 25'. The centres of any two of these adjacent holes are (for example) equal to half of the distance between the centres of any two of the adjacent holes or slots 29 of the band 20, the purpose thereof, being for the finer adjustment in the tightening operations, than would otherwise be possible.

This auxiliary or adapter plate 30 is freely carried on the band 20, by means of companion side lugs 32.

In the use of the said invention:—

The loop 21, being anchored around the lip 23 and secured thereon by rivet 22 as aforesaid, the band is passed around the hose and/or tube and drawn as finger-tightly as possible, and by one of the holes or slots 29 threaded over the pin 28'.

Alternatively (when the plate 30 is used), the pin 28' is threaded through one of the holes 31 in the bracket 25 and then one of the holes 29 in the band 20 is threaded thereover in a finger-tight manner (see Fig. 11).

The cam-lever 24 is now, on its pivot pins 27 brought over to the position as shown in Fig. 10, and by virtue of the eccentric mounting of the loop of the said band, the latter is drawn tightly, and in passing over the pivotal centre of the bracket, same is locked in position, thus securely holding the clip as a whole on the pipe or hose.

It is of course to be understood that the plate 30 and pin 28' is not shown in Fig. 10, and is only usable when finer adjustments are desirable. In the said latter use, suppose same is positioned as shown in Fig. 11, and it is desired to slightly tighten the band to a lesser degree than would be possible by threading the next hole of the band over the pin (when latter is fixed in the bracket of the base plate). The pin in the auxiliary adapter plate in this case is threaded through the companion hole in the bracket and the same hole from which it is withdrawn in the band 20, is again threaded and co-acted therewith (that is of course prior to the lever-tightening operation); the lever is then brought to the locking position for the desired slightly increased tightening of the clip as a whole.

On the other hand, if the pin and the auxiliary adapter plate were in the latter mentioned position, and a further slight tightening were desired, the lever would be loosened, and the pin would be positioned in the lower companion hole of the bracket, and the next following hole of the band threaded thereover, the cam lever then being operated as aforesaid.

It will thus be seen from the foregoing that we provide a simple and effective, and easily operated device for the purposes as aforesaid.

Although we have described the invention in connection with a hose joint tightener, we desire it to be understood that the method of adjustment herein described and set forth may also be adaptable to belts, wool-press bands and in other instances where an adjustable tightening of a like nature is desired.

What we claim as our invention and desire to secure by Letters Patent is:—

1. In a device as and for the purposes herein set forth, a flexible band having a loop at one end, a cam-lever having an eccentric turned over lip freely anchoring and holding same, a bracket, a pin projecting beyond the bracket, pivot means securing said cam-lever to said bracket, said band adjacent its other end having a slot for anchoring same to said pin.

2. In a device as and for the purposes herein set forth, a flexible band having a loop at one end, a cam-lever having an eccentric turned over lip freely anchoring and holding same, a bracket having a slot, pivot pin means securing said cam-lever to said bracket, said band adjacent its other end having a slot, and an auxiliary plate having lugs slidably engaging the band, said auxiliary plate having a pin passing through the said slots.

3. In a device as and for the purposes herein set forth, a flexible metal band to encircle the member or body to be clamped, one end of said band being a loop, a rivet passing through the loop and adjacent part of the band, a cam-lever having an eccentric turned over lip, said band having slots, a bracket having slots, pivot pin means mounting the cam-lever on the bracket, said lip providing an opening in the said lever, an auxiliary plate having lugs slidably engaging the flexible band, and an upstanding pin on the said auxiliary plate passing through selected slots of the band and bracket.

WALTER LESLIE JACKSON.
KINGSLEY JOHN JACKSON.